Jan. 5, 1926. 1,568,742
H. JUNG
RYE BREAD BAKING UTENSIL
Filed March 25, 1924   2 Sheets-Sheet 1

Inventor
Henry Jung,
By _____ Talbert,
His Atty.

Jan. 5, 1926.  
H. JUNG  
RYE BREAD BAKING UTENSIL  
Filed March 25, 1924  2 Sheets-Sheet 2
1,568,742
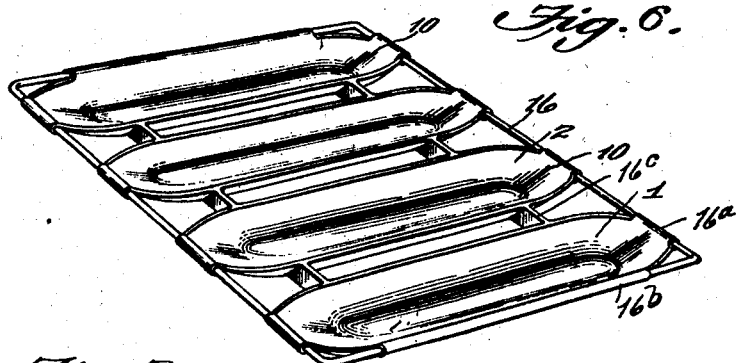
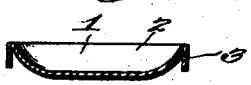
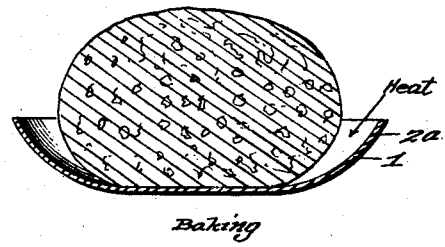
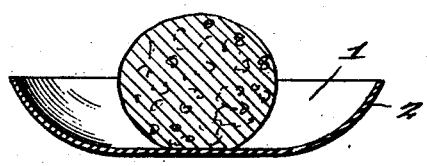
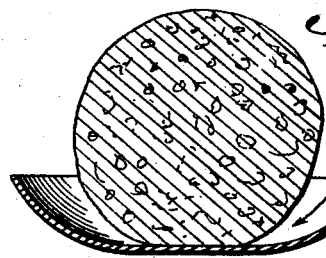
Inventor  
Henry Jung,  
By _____  
His Atty.

Patented Jan. 5, 1926.

1,568,742

UNITED STATES PATENT OFFICE.

HENRY JUNG, OF LADYSMITH, WISCONSIN.

RYE-BREAD-BAKING UTENSIL.

Application filed March 25, 1924. Serial No. 701,754.

*To all whom it may concern:*

Be it known that HENRY JUNG, a citizen of the United States of America, residing at Ladysmith, in the county of Rusk and State of Wisconsin, has invented new and useful Improvements in Rye-Bread-Baking Utensils, of which the following is a specification.

It is the purpose of the present invention to advance the art of baking rye bread in a neater loaf with an interior having a better consistency of moisture.

To accomplish this, the pan is of relatively shallow concavity, a marginal rise being produced to conserve the popular style rye loaves now in use (circular and elongated oval) and also serving to keep the loaf from rolling off the pan when taken from the oven, for when placing a loaf in the oven there is no danger of the loaf rolling off as the dough is yet raw and sluggish. Due to the pan being shallow with just enough marginal rise with the dough in the center of the flat bottom, the heat follows the exterior of the marginal rise and then, due to the rise having a free marginal edge, the heat feeds back over the edge and substantially under the loaf, causing it to draw and expand upward in a round formation.

A pan of this kind permits a saving of time, labor and waste. Obviously, by causing the loaf to draw up round prevents the loaf from slopping over, thereby avoiding any black spots on the surface of the loaf.

Another advantage for the pan with a marginal rise, in addition to giving the article a pan effect, is the idea of making the rise low enough to expose practically all of the dough to instantaneous contact with the heat.

In the drawings:

Figure 6 is a view of a plurality of pans, each like the pan in Figure 4, the series being strapped together.

Figure 7 is a longitudinal sectional view on line 7—7 of Figure 4.

Figure 8 is a cross sectional view on line 8—8 of Figure 4.

Figure 9 is a sectional view on line 9—9 of Figure 3, with the dough in the act of baking.

Figure 10 is a transverse sectional view of a pan showing a finished loaf.

Figure 11 is a sectional view of a pan showing the rye bread dough molded and resting on the pan.

Figure 12 is a sectional view on line 12—12 of Figure 1.

Figure 1:
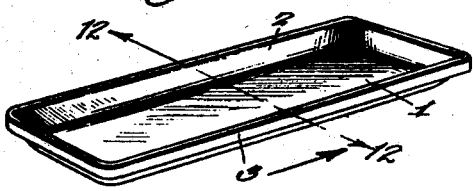
Figure 1 is a view in perspective of a pan constructed in accordance with the invention, with a marginal rise.
Figure 2:
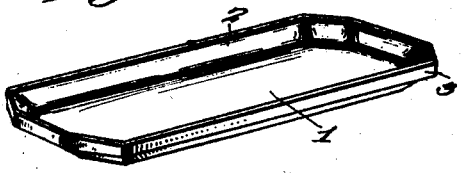
Figure 2 is a view in perspective of a rye bread baking pan with its ends polygon shape to bake loaves with substantially flat ends.
Figure 3:
Figure 3 is a perspective view of a rye bread baking pan with its ends rounded, still adhering to the relatively low marginal rise.

Referring to the drawings, 1 designates a pan of any proportions and of any suitable sheet metal. The pan has a marginal rise 2 like that in Figures 1, 2 and 3, or like a corresponding rise 2ª in Figures 3 and 4. The rise 2 in Figure 1 merges and inclines upward from the bottom, with its inner surface curved, and where its inclined portion terminates at its upper edge, it merges into a downturned flange 3. The only difference between Figures 1 and 2 is the particular marginal shape of the pan.

This rise gradually slopes arcuately outwardly and upwardly from a point lying in a vertical plane spaced inwardly from the free marginal lateral edge of the pan a distance substantially equal to its own height. The pan is constructed of imperforate sheet metal, the marginal rise being low enough, allowing the heat to follow the exterior of the outward and upward arcuate rise, and due to the edge of the rise being free, the heat turns over the edge and substantially follows the interior curvature of the rise and finds its way under and around the loaf, causing it to draw and expand upward in a round formation during the process of baking. Each of the pans as disclosed in the drawings has a substantial length and width with a solid wall throughout and provided with a flat bottom. The width of the flat bottom is substantially equal to twice the height of the rise, whereby the heat may follow the exterior of the rise and over the free edge and down under a body of rye bread dough, causing it to draw and expand upward in a round formation.

The marginal rises of the various pans serve to keep the loaf from rolling off when removed from the oven. As a result of shaping and during baking, the loaf takes a cylindrical shape. The dough, when baking, draws up, leaving a very small part flat, which remains in contact with the pan. In some cases, when the dough is not relatively stiff, it fills the pan but as the loaf draws up round, the heat feeds around and under the bottom of the loaf, the loaf then resembling hearth baked bread.

Figure 4:
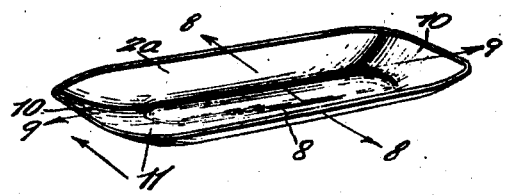
Figure 4 is a perspective view of an elongated rye bread baking pan with its corners rounded slightly.

The pan 8 in Figure 4 is dished, providing a marginal rise 2ª to prevent the loaf from rolling off.

The opposite ends of the pan in Figure 4 have short straight parallel end margins 10 which merge arcuately into the longitudinal margins at 11.

The rye bread dough is shaped so as not to extend the full width of the pan. Circular, elongated or poylgonal pans, with a marginal rise, permits the loaf to expand upward and contact between the sides, the same as if such pans were bars on the hearth of an oven, the heat finding its way under the loaf, leaving a very small part of the lower crust in contact with the pan. The long polygonal pans produce rye bread in the same class with other pan breads heretofore and now in general use, said class being more acceptable to the consumer.

Rye bread baked in pans of this type is of uniform dimensions and is moist similar to the wheaten pan loaves.

The especially low marginal rise or rim, when the dough is shaped as in Figure 11, causes the heat to follow the exterior of the rise and take a return bend over the free edge of the rise and follow the interior, the heat finding its way under and around the loaf, the loaf drawing up considerably high and a substantial distance above the rim to insure a thorough bake which is essential to rye bread.

Figure 5:
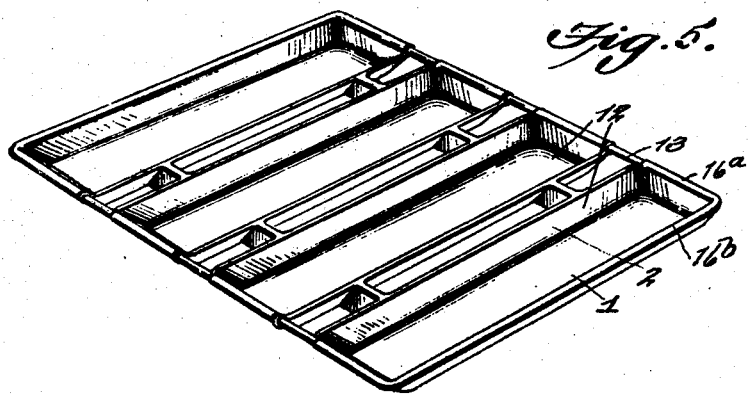
Figure 5 is a view showing a series of pans like the pan in Figure 1 and strapped together.

In Figure 5, a plurality of pans 12 are shown strapped together by the metallic straps 13. The construction of these pans is the same as disclosed in Figure 1. Such pans for rye bread permit a number of loaves to be handled simultaneously and with facility, with very little risk of the dough falling prior to contacting with the heat.

A plurality of pans in Figure 6 have a marginal metallic strap 16 secured to the short transverse straight ends 10. This marginal strip 16 extends along the sides of the end pans and enables the pans to be handled as one body.

The marginal edges of the end rises of each of the plurality of pans in Figures 6 and 8 and the remote rises of the end pans of said plurality are provided with overturned rolls 16ª and 16ᵇ which receive the metallic straps 13 and 16. The several pans in Figures 6 and 8 are spaced substantially and are connected by ribs 16ᶜ which are united with the pans in any suitable manner as by brazing or soldering. Said ribs extend the full height of the rises of the pans, thereby insuring rigidity.

By placing a newly formed loaf of rye bread on the metallic pan, the bread having sufficiently risen, the pan is placed in the oven by means of a peel or shovel from which the pan slides off tight up against other pans. The reasons for this are because the pan is handled and not the dough, its proper shape and volume being undisturbed and retained from disfiguring substances and stains.

In order that a loaf of bread may resemble hearth baked bread, a squatty shaped pan is necessary, so that the entire circumference of the bread may have direct contact with the heat instead of the heat with the side walls of the pan, through which the heat must first penetrate. The present type of pan has just enough margin so that the rye bread dough may be shaped high, allowing sufficient rise to take place and bake properly without destroying the expansion and texture of the loaf in or out of the oven.

Rye bread baked in the present form of pan may be cut in more even and uniform slices with the proper texture of crust comparable with white bread. Rye bread so baked has a very thick crust all around it, as a great deal of moisture is allowed to escape.

The process comprises two features, one to conserve the old and present day styles of loaves and the other to inaugurate the pan made style to resemble the style in which wheat bread is made. The marginal rise of the pan is merely high enough to prevent the rounded baked loaf from rolling off the pan when taken from the oven.

The invention having been set forth, what is claimed is:

1. As an article of manufacture, a baking device comprising a plurality of rye bread baking pans spaced in edgewise parallelism and in sequence, ribs connecting the spaced edges of the pans at points near the ends thereof, said ribs extending the full height of the rises of the pans, each pan having a substantial length and width and being composed of a solid wall of imperforate sheet metal, said pan being dished, the dished portion consisting of a flat bottom, the flat bottom at its outer annular terminal portion merging into a marginal rise which gradually slopes arcuately outwardly and upwardly from a point lying in a vertical plane spaced inwardly from the marginal lateral edge of the pan a distance substantially equal to its own height, the width of the flat bottom being substantially equal to twice the height of the rise, whereby the heat may follow the exterior of the rise and over the free edge and down under a body of rye bread dough, causing it to draw and expand upward in a round formation, the marginal edges of the end rises and the remote rises of each pan of the end pans having overturned rolls, and a rectangular tie rod engaging in all of the rolls for reinforcing and holding the pans rigidly.

2. As an article of manufacture, a rye bread baking pan having a substantial length and width and constructed of imperforate sheet metal and being dished, the dished portion consisting of a flat bottom, the flat bottom at its outer annular terminal portion merging into a marginal arcuate rise which gradually curves and slopes outwardly and upwardly from a point lying in a vertical plane spaced inwardly from the marginal lateral edge of the pan a distance substantially equal to its own height, whereby the heat may follow the exterior of the rise and return down over the free edge, the width of the flat bottom being substantially equal to twice the height of the rise, whereby the heat in returning over the free edge may find its way under a body of rye bread dough, causing it to draw and expand upward in a round formation.

In testimony whereof he affixes his signature.

HENRY JUNG.